US008847736B2

(12) United States Patent
Kim et al.

(10) Patent No.: US 8,847,736 B2
(45) Date of Patent: *Sep. 30, 2014

(54) IMAGING-BASED RADIO-FREQUENCY IDENTIFICATION TRANSPONDER (76) Inventors: Moon J. Kim, Wappingers Falls, NY (US); Bonwoong Koo, Los Altos, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 12/953,568

(22) Filed: Nov. 24, 2010

(65) Prior Publication Data

US 2012/0127289 A1    May 24, 2012

(51) Int. Cl.
*H04Q 5/22* (2006.01)
*H04N 7/18* (2006.01)

(52) U.S. Cl.
CPC .................................. *H04N 7/183* (2013.01)
USPC ......... 340/10.34; 30/13.26; 30/7.33; 30/5.82; 30/5.83

(58) Field of Classification Search
CPC ............ G06K 19/0723; G06K 7/0008; G06K 19/0701; G07C 9/00111; G07C 2009/00793; B61L 25/043; G08C 19/12; G08C 17/02; G08C 19/14; A63H 30/04; E05F 15/2076; G01R 23/005; G01R 23/06; H04W 88/027; G05D 1/0011; A63J 17/00; B67D 7/348; G06F 1/1626
USPC ............ 340/10.5, 10.34, 13.23, 13.24, 13.26, 340/5.82, 5.83; 348/61
See application file for complete search history.

(56) References Cited

U.S. PATENT DOCUMENTS 7,374,105 B2    5/2008  Zhu et al.
7,443,299 B2   10/2008  Forster
7,515,049 B2    4/2009  Sharma et al.
7,659,821 B2    2/2010  Kim et al.
7,786,868 B2    8/2010  Forster
2005/0071714 A1*  3/2005  Soga et al. ..................... 714/704
2006/0202032 A1    9/2006  Kricorissian
2006/0219864 A1* 10/2006  Patterson ................... 250/208.1
2007/0285244 A1   12/2007  Tucker et al.
2008/0180249 A1*  7/2008  Butler et al. ................ 340/572.1
2008/0232691 A1*  9/2008  Gkikas et al. ................. 382/190
2009/0085750 A1    4/2009  Waldner et al.
2009/0256938 A1* 10/2009  Bechtel et al. ................ 348/302
2009/0289773 A1   11/2009  Hoyt et al.
2010/0039234 A1*  2/2010  Soliven et al. ............... 340/10.1
2010/0201488 A1    8/2010  Stern et al.

* cited by examiner

*Primary Examiner* — Omer S Khan
(74) *Attorney, Agent, or Firm* — Keohane & D'Alessandro PLLC (57) ABSTRACT The present invention relates to an imaging-based radio-frequency identification (RFID) transponder. Specifically, the transponder includes a photo-responsive cell for capturing an image; and an analysis component. The photo-responsive cell captures images of objects. Once captured, the analysis component is configured to: determine whether the RFID transponder has sufficient power to analyze the image; analyze the image on the RFID transponder if sufficient power exists; and/or transmit data corresponding to the image to an RFID reader for analysis in the event the RFID transponder has insufficient power to analyze the image. Where quality of the image and/or performance of the transponder are less than desirous, any number of corrective approaches can be taken. For example, the setup of the transponder can be adjusted, the range readout can be reduced, the integration time per pixel of the image can be increased, etc. Moreover, the range of the RFID transponder can be increased using any of the approaches discussed in the above-incorporated patent applications.

20 Claims, 10 Drawing Sheets

- Photon to hole & electron pair

FIG. 4A

- Photo current or voltage from photon

FIG. 9

IMAGING-BASED RADIO-FREQUENCY IDENTIFICATION TRANSPONDER

CROSS-REFERENCE TO RELATED APPLICATIONS

This application is related in some aspects to co-pending application Ser. No. 12/949,033 (U.S. Patent Publication No. 2012/0126945 A1), entitled "STRONG PASSIVE AD-HOC RADIO-FREQUENCY IDENTIFICATION (RFID)", which was filed on Nov. 18, 2010, the entire contents of which are herein incorporated by reference. This application is also related in some aspects to co-pending application Ser. No. 12/950,188 (U.S. Patent Publication No. 2012/0126955 A1), entitled "ACTIVE ENERGY HARVESTING FOR RADIO-FREQUENCY IDENTIFICATION DEVICES", which was filed on Nov. 19, 2010, the entire contents of which are herein incorporated by reference.

FIELD OF THE INVENTION

The present invention generally relates to radio-frequency identification (RFID) technology. Specifically, the present invention relates to an imaging-based RFID transponder.

BACKGROUND OF THE INVENTION

Over recent years, RFID has become an increasing function of providing wireless communications. For example, RFID is commonly implemented in security devices (e.g., swipers and/or card readers) for businesses as well as in many other areas. Unfortunately, RFID is typically passive and has its range limited by distance and physical obstacles. Moreover, RFID reader power is limited by regulation, which causes range issues since RFID operational range is constrained by the available power. As such, RFID reliability, responsiveness, and functionality are commonly compromised in practical environments. The related art has failed to provide such functionality, including those references listed below:

U.S. Pat. No. 7,786,868 discloses an RFID device with multiple passive operation modes that are fully passive or boosted passive. The boosted passive mode utilizes an internal energy booster. The energy booster may include a one-port transistor and an energy source that is used to power the transistor.

U.S. Pat. No. 7,443,299 discloses an extended range RFID system for discs such as CDs, DVDs, or minidiscs. A special RFID transponder and antenna configuration is used and antenna elements are coupled to the transponder extending in opposite directions across an outer annular zone. The monopole or dipole mode of antenna operation (utilizing a metalized disc layer) results from this antenna configuration and is stated as "to more than double the range of the system".

U.S. Pat. No. 7,374,105 discloses an RFID tag having an RFID integrated circuit and an antenna that are combined with a first passive antenna circuit to provide an extended operating range. The second passive antenna circuit is essentially identical to the first antenna, only it has larger dimensions, and is positioned with the coil of the second passive antenna circuit surrounding the first coil to extend the operating range.

U.S. Patent Application 20090289773 discloses a method for extending the read range of passive RFID tags. Excess excitation energy is dissipated through circuitry for a constant current power supply that is implemented either with discrete components integrated into the ASIC design, a network that minimizes the amount of energy that is converted to heat by a traditional configuration's shunt regulator, and/or a sleep mode for reducing the energy consumed by an RFID tag after it has been read.

U.S. Patent Application 20090085750 discloses an extended RFID tag. The extended range RFID tag includes a UHF RFID tag having a dipole antenna attached to a surface of a substrate and further includes an antenna extension that overlaps a portion of the dipole antenna for electromagnetically coupling the antenna extension and the dipole antenna when in operation.

U.S. Patent Application 20070285244 discloses a long-range RFID transponder. The improved range is achieved through the RFID power generation's Passive Magnetostrictive Electroactive device component. One example includes a passive magnetic field sensor made of layers of Terfenol-D magnetostrictive material and ceramic PXT-5 to act as a generator to power the RFID when in range of the querying transceiver magnetic field.

U.S. Pat. No. 7,659,821 discloses a smart RFID infrastructure and method that enables communication between RFID tags. Information tables from individual RFID tags are aggregated into master information tables on writeable RFID tags.

U.S. Pat. No. 7,515,049 discloses an extended read range RFID system. This system utilizes an apparatus to extend the reader's antenna signal to a location proximate to the RFID tag. In another embodiment, the apparatus utilizes at least one magnetic rod to create a magnetic path for the RF field to travel between the reader's antenna and the RFID tag.

U.S. Patent Application 20100201488 discloses a system for displaying read range of an RFID reader based upon feedback from fixed RFID beacon tags. An interrogation signal is transmitted from the RFID reader to these fixed RFID beacon tags at known locations.

U.S. Patent Application 20060202032 discloses an automatic identification and data capture system.

SUMMARY OF THE INVENTION

In general, the present invention relates to an imaging-based radio-frequency identification (RFID) transponder. Specifically, the transponder includes a photo-responsive cell for capturing an image; and an analysis component. The photo-responsive cell captures images of objects. Once captured, the analysis component is configured to: determine whether the RFID transponder has sufficient power to analyze the image; analyze the image on the RFID transponder if sufficient power exists; and/or transmit data corresponding to the image to an RFID reader for analysis in the event the RFID transponder has insufficient power to analyze the image. Where quality of the image and/or performance of the transponder are less than desirous, any number of corrective approaches can be taken. For example, the setup of the transponder can be adjusted, the range readout can be reduced, the integration time per pixel of the image can be increased, etc. Moreover, the range of the RFID transponder can be increased using any of the approaches discussed in the above-incorporated patent applications.

A first aspect of the present invention provides an imaging-based radio-frequency identification (RFID) transponder, comprising: a photo-responsive cell for capturing an image; and an analysis component for analyzing the image on the RFID transponder based on an available power in the RFID transponder.

A second aspect of the present invention provides an imaging-based radio-frequency identification (RFID) transponder, comprising: a photo-responsive cell for capturing an image; and an analysis component being configured to: determine whether the RFID transponder has sufficient power to analyze the image; analyze the image on the RFID transponder if sufficient power exists; and transmit data corresponding to the image to an RFID reader for analysis in the event the RFID transponder has insufficient power to analyze the image.

A third aspect of the present invention provides an method for capturing an image using a radio-frequency identification (RFID) transponder, comprising: capturing an image using a photo-responsive cell integrated with the RFID transponder; determining whether the RFID transponder has sufficient power to analyze the image; analyzing the image on the RFID transponder if sufficient power exists; and transmitting data corresponding to the image to an RFID reader for analysis if the RFID transponder has insufficient power to analyze the image.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description of the Invention
II. Illustrative Implementation

I. General Description of the Invention

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, RFID is a technology that incorporates the use of electromagnetic or electrostatic coupling in the radio frequency (RF) portion of the electromagnetic spectrum to uniquely identify an object, animal, or person. RFID is coming into increasing use in the industry as an alternative to the bar code. The advantage of RFID is that it does not require direct contact or line-of-sight scanning. An RFID system consists of three components: an antenna and transceiver (often combined into one reader) and a transponder (the tag). The antenna uses radio frequency waves to transmit a signal that activates the transponder. When activated, the tag transmits data back to the antenna. The data is used to notify a programmable logic controller that an action should occur. The action could be as simple as raising an access gate or as complicated as interfacing with a database to carry out a monetary transaction. Low-frequency RFID systems (e.g., 30 KHz to 500 KHz) have short transmission ranges (generally less than six feet). High-frequency RFID systems (850 MHz to 950 MHz and 2.4 GHz to 2.5 GHz) offer longer transmission ranges (more than 90 feet). RFID is sometimes called dedicated short range communication (DSRC).

RFID tags and labels (collectively referred to herein as "devices" or "transponders") are widely used to associate an object with an identification code or other information. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. As noted above, RFID devices are generally categorized as labels or tags. RFID labels are RFID devices that are adhesive or otherwise have a surface attached directly to objects. RFID tags, in contrast, are secured to objects by other means (for example, by use of a plastic fastener, string, or other fastening means).

RFID devices include: (1) active tags and labels, which include a power source for broadcasting signals; and (2) passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory, and the like. RFID tags and labels also can be characterized as those to which information is written only once (although the information may be read repeatedly), and those to which information may be written to repeatedly during use. For example, RFID tags may store environmental data (that may be detected by an associated sensor), logistical histories, state data, etc.

Along these lines, RFID devices can be further characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited.

As indicated above, the present invention relates to an imaging-based radio-frequency identification (RFID) transponder. Specifically, the transponder includes a photo-responsive cell for capturing an image; and an analysis component. The photo-responsive cell captures images of objects. Once captured, the analysis component is configured to: determine whether the RFID transponder has sufficient power to analyze the image; analyze the image on the RFID transponder if sufficient power exists; and/or transmit data corresponding to the image to an RFID reader for analysis in the event the RFID transponder has insufficient power to analyze the image. Where quality of the image and/or performance of the transponder are less than desirous, any number of corrective approaches can be taken. For example, the setup of the transponder can be adjusted, the range readout can be reduced, the integration time per pixel of the image can be increased, etc. Moreover, the range of the RFID transponder can be increased using any of the approaches discussed in the above-incorporated patent applications.

Figure 1:
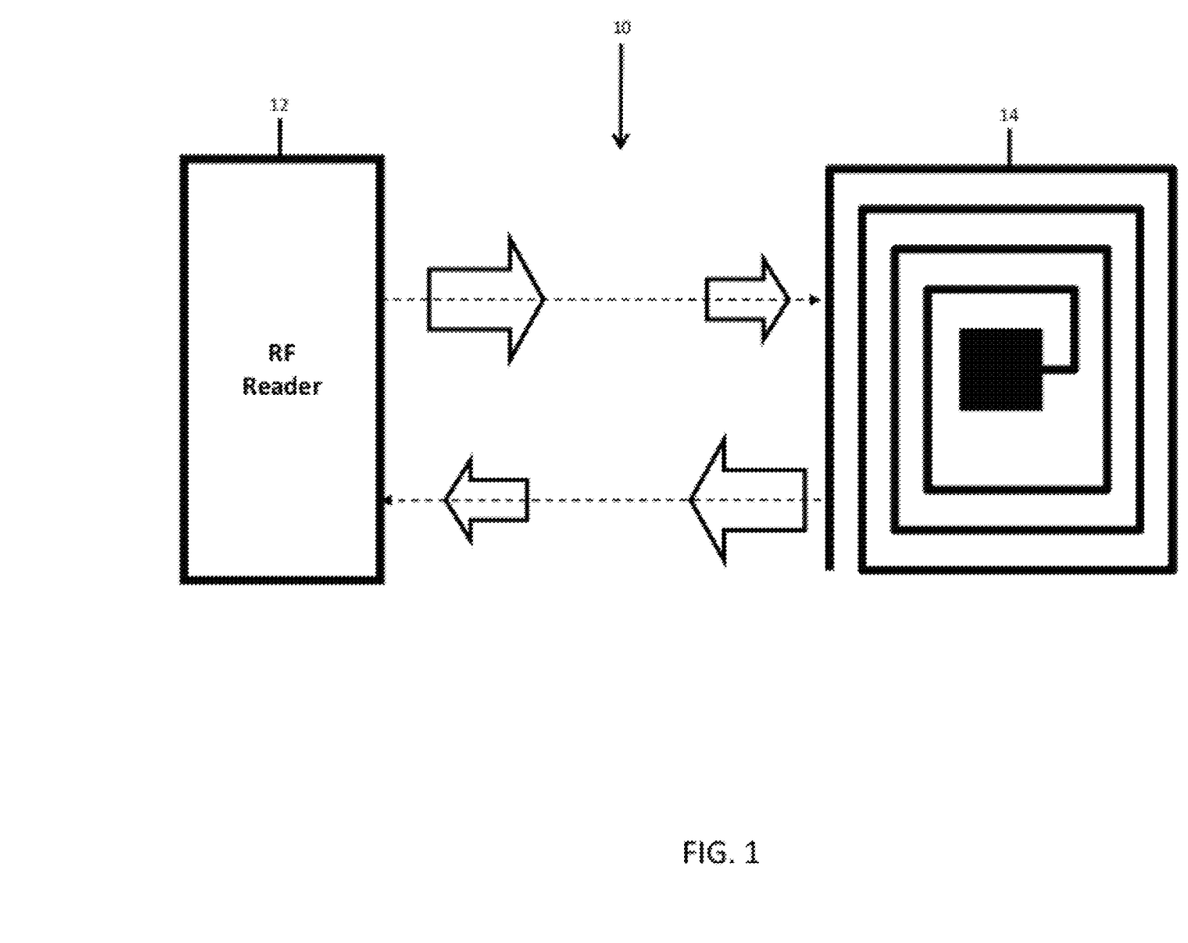
FIG. 1 depicts an RFID configuration according to an embodiment of the present invention.

Referring now to FIG. 1, an illustrative RFID configuration according to the present invention is shown. As depicted, configuration 10 shows an RFID transceiver/reader 12 communicating with RFID transponder 14. Transponder 14 can be any type of RFID transponder now known or later developed. Examples include the aforementioned labels and/or tags. As further shown, RFID reader 12 and RFID transponder 14 will exchange data (e.g., security information, etc.). Under the present invention, these types of components will be leveraged to create a strong passive ad-hoc RFID network that is (among other things) capable of communicating over longer distances and around physical objects.

Figure 2:
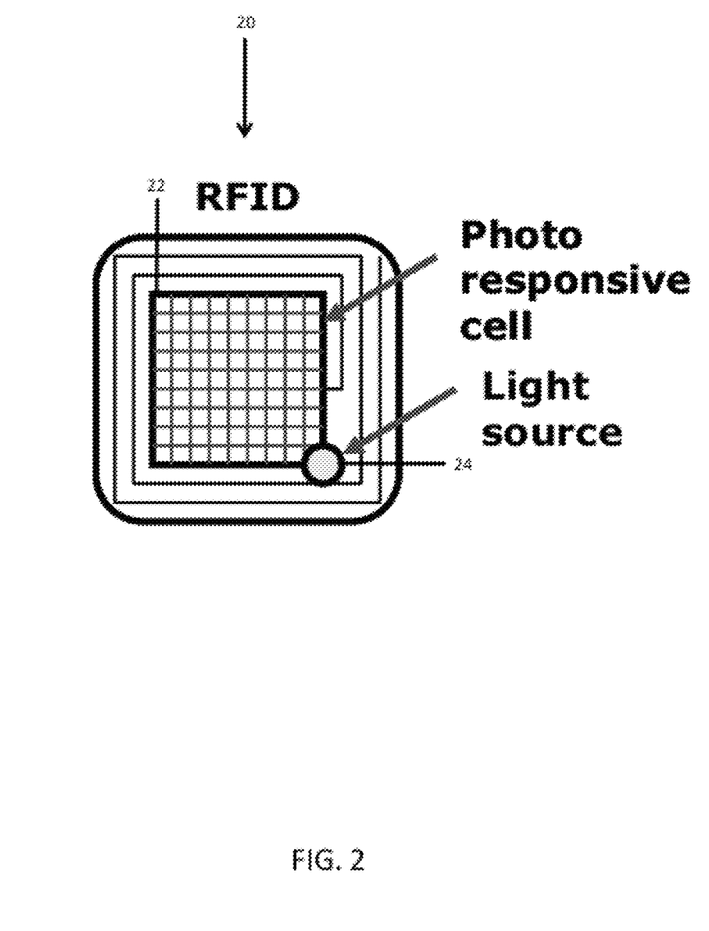
FIG. 2 depicts an imaging-based RFID transponder according to an embodiment of the present invention.

Under the present invention, a transponder such as transponder 14 will be adapted to incorporate image capture and analysis functionality. Referring now to FIG. 2, an RFID transponder 20 having a photo-responsive cell and an optional light source 24 is shown. In general, it includes various components that allow: an image to be captured; a determination to be made whether sufficient power exists in the RFID transponder to analyze the image; analyze/process the image if sufficient power exists; transfer data corresponding to the image to an RFID reader if insufficient power exists; and/or employ various approaches for improving image quality.

Figure 3A:
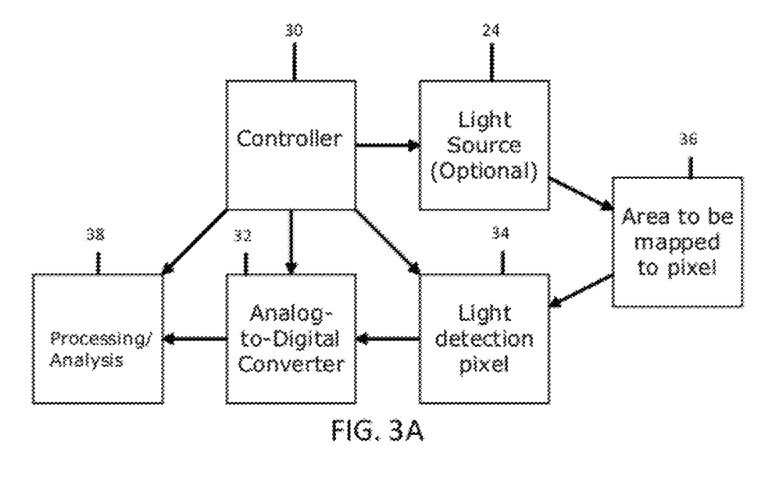
FIGS. 3A-B depict image analysis/processing components according to an embodiment of the present invention.
Figure 3B:
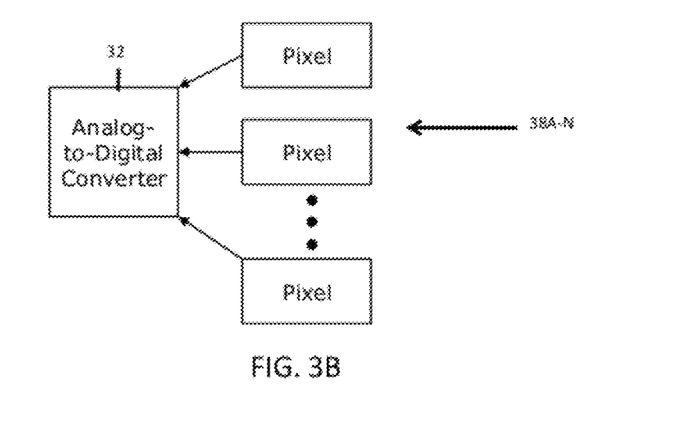

FIGS. 3A-B show components that can be incorporated within the transponder 20 of FIG. 2. As depicted, transponder 20 can include a controller 30, which can control photo-responsive cell 22 of FIG. 2 to capture an image using optional light source 24 for illumination. When an image is captured, an area to be mapped to pixel 36 is designated. Then, a light detection pixel 34 and an analog-to-digital converter 32 will be utilized to process/analyze the image. Along these lines, controller 30 can determine whether transponder 20 has sufficient power to perform a processing/analysis 38. If not, the image (or image data) can be transferred to an RFID reader in communication with transponder 20 to perform any such processing/analysis. If, however, sufficient power does exist, then processing/analysis component 38 can perform the same. As shown in FIG. 3B, pixels 38A-N are fed to analog-to-digital converter 32 so that the image will be in digital format when processed/analyzed. Along these lines, image read out data can be based upon any of the following characteristics: pixel-by-pixel or partial readout depending on power, illumination, sensitivity, number of intensity levels, decision threshold, channel condition, etc.

Figure 4A:
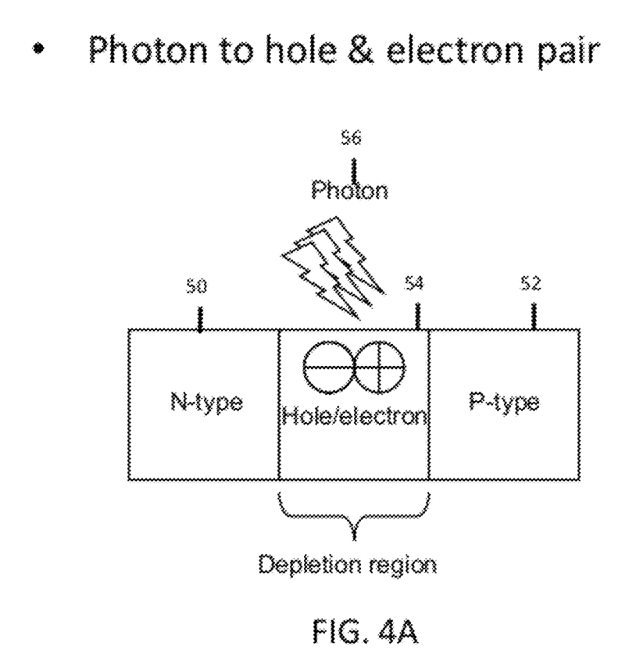
FIGS. 4A-B show photon behavior according to an embodiment of the present invention.
Figure 4B:
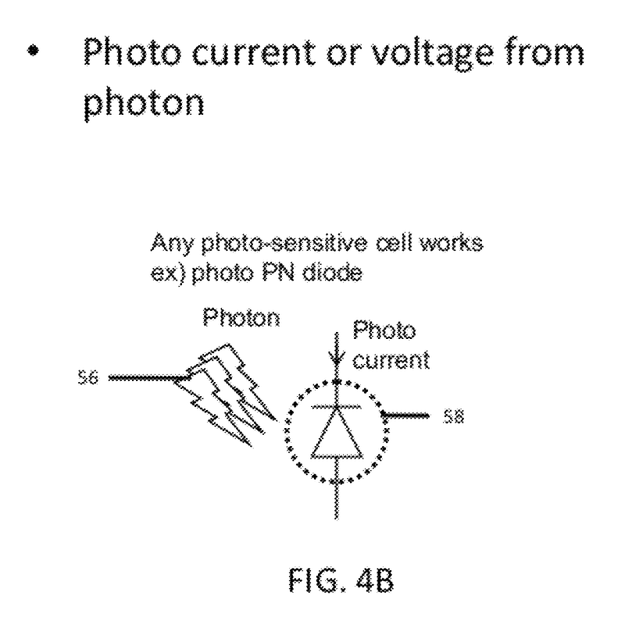
Figure 5:
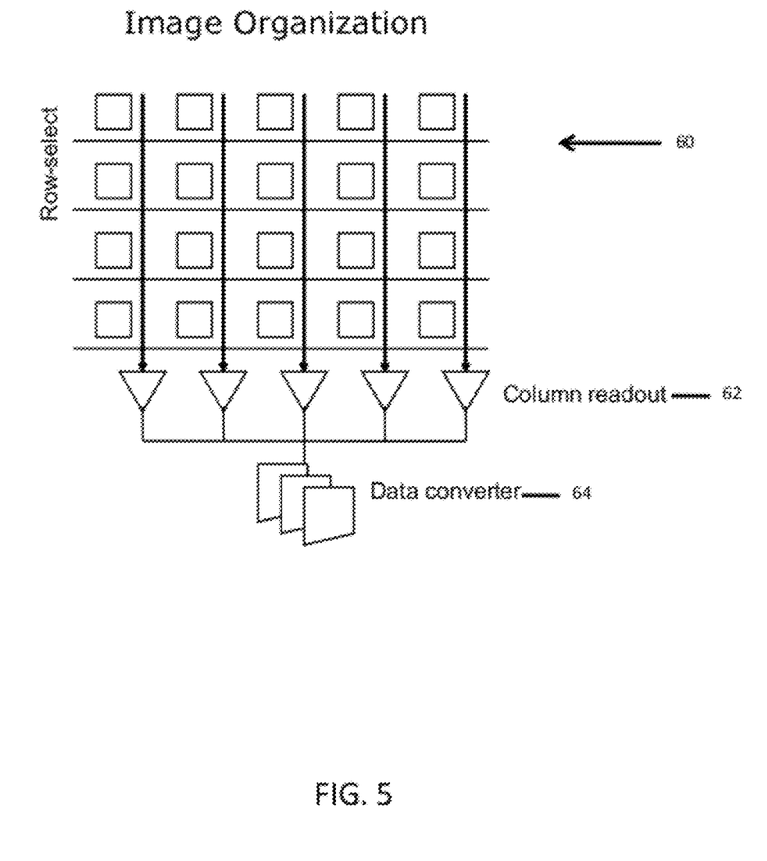
FIG. 5 shows image organization according to an embodiment of the present invention.

FIGS. 4A-B show one possible embodiment of photo-responsive cell 22 of FIG. 2 and its interaction with photon 56. As depicted, in FIG. 4A, a depletion region 54 can be provided between an N-type region 50 and a P-type region 52. As shown, a photon 56 will impact the hole/electric pair in depletion region 54. As shown in FIG. 4B, any type of photo-sensitive cell can be implemented hereunder. One such example is a photo PN diode 58 which can be impacted by photon 56. FIG. 5 shows how image data can be organized and/or processed hereunder. As depicted, image data can be implemented in a column-row matrix 60. Based thereon, a column readout 62 can be made and fed to a data converter 64 for processing.

II. Illustrative Embodiment

Figure 6:
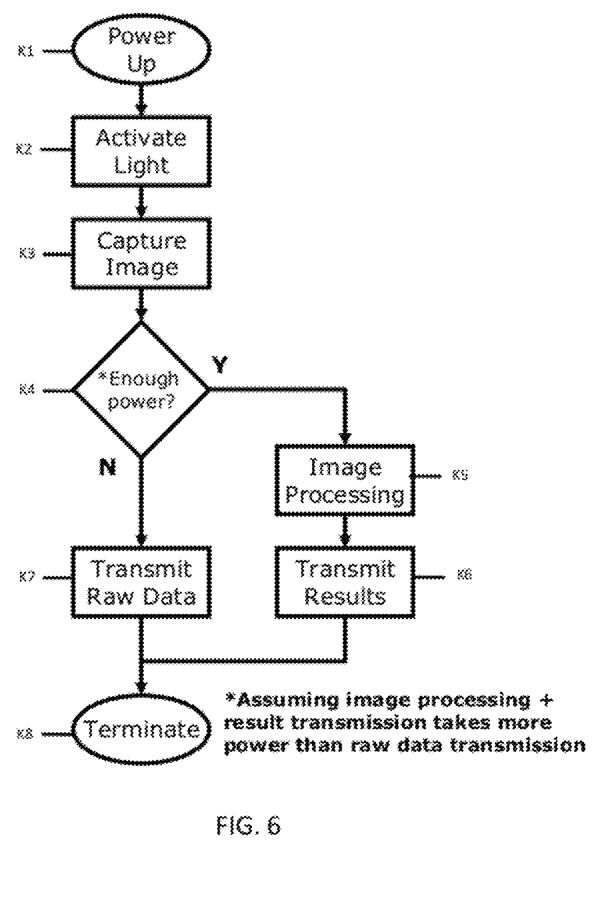
FIG. 6 shows a method flow diagram for analyzing an image according to an embodiment of the present invention.

Referring now to FIG. 6, an illustrative flow diagram of an image capture and analysis method based on the concepts of FIGS. 1-5. As shown, in step K1, power is activated and in step K2, the optional light can be activated. In step K3, the image is captured. In step K4, it is determined whether there is sufficient power to analyze/process the image on the transponder. If so, the image is processed in step K5, and transmitted to the RFID reader in step K6. If sufficient power was not present, the image data will be transmitted to the RFID reader in step K7 where it will be processed/analyzed. Regardless, the process can then terminate in step K8.

Figure 7A:
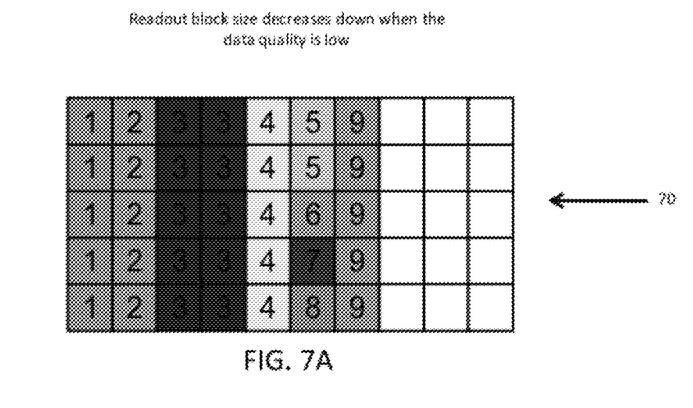
FIGS. 7A-B show the impact of quality and environment on readout block size according to an embodiment of the present invention.
Figure 7B:
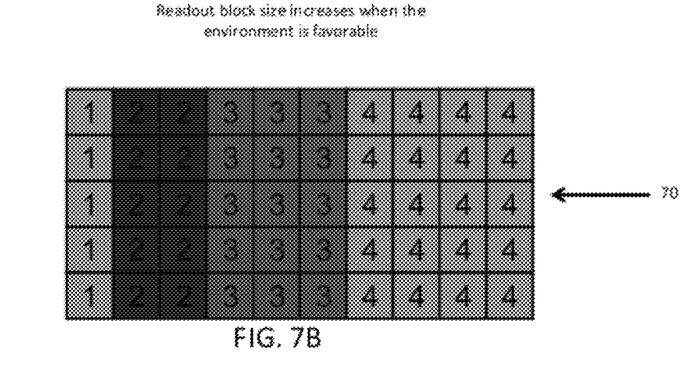

Once the image has been captured, image quality, processing, etc., can be affected by various elements. For example, as shown in FIG. 7A, readout block size 70 decreases in pixels when the data quality is low. Conversely, as shown in FIG. 7B, readout block size 70 increases when the environment is favorable.

Figure 8:
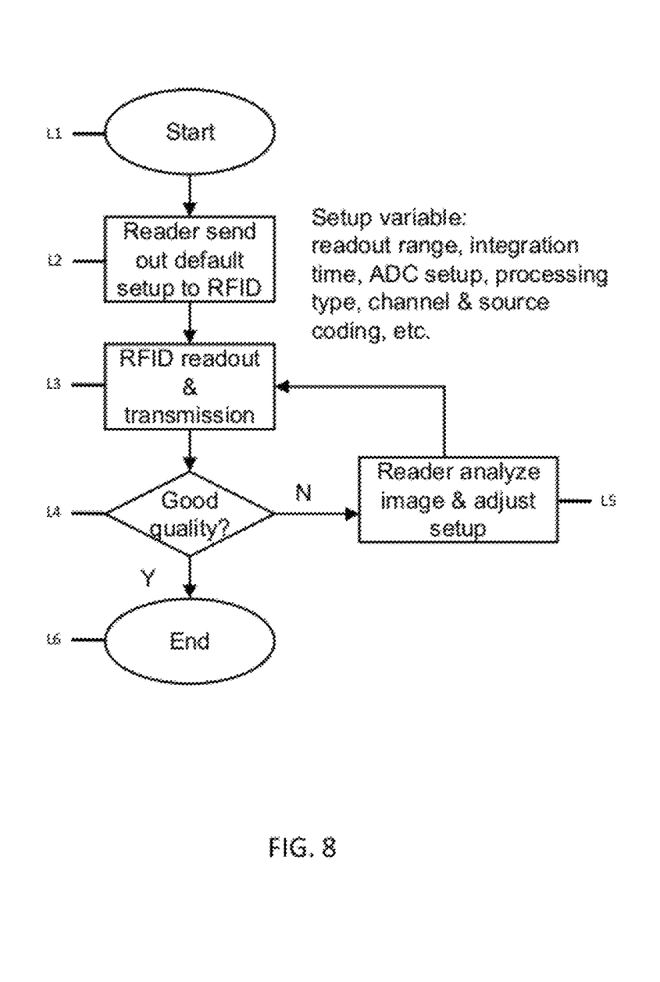
FIG. 8 depicts a method flow diagram for adjusting a setup of an RFID to improve image quality according to an embodiment of the present invention.

Occasionally, image quality may not be as good as desired. The present invention thus provides various approaches for improving image quality. Three of these approaches are described in FIGS. 8-10. Referring first to FIG. 8, as shown, the process is started in step L1. In step L2, the reader sends out default setup to the RFID transponder. Such setup can address variables such as readout range, integration time, ADC setup, processing type, channel and source, coding, etc. Regardless, in step L3, RFID readout and transmission is made. In step L4, it is determined whether sufficient quality exists. Sufficient quality can be determined by comparing the image to a predetermined threshold. This can be accomplished by the RFID reader using techniques such as a threshold pixel scan, a gray scale pixel scan, and/or image recognized data. If quality does not meet thresholds, the reader can adjust the setup in step L5. Once quality is sufficient, the process can end in step L6.

Figure 9:
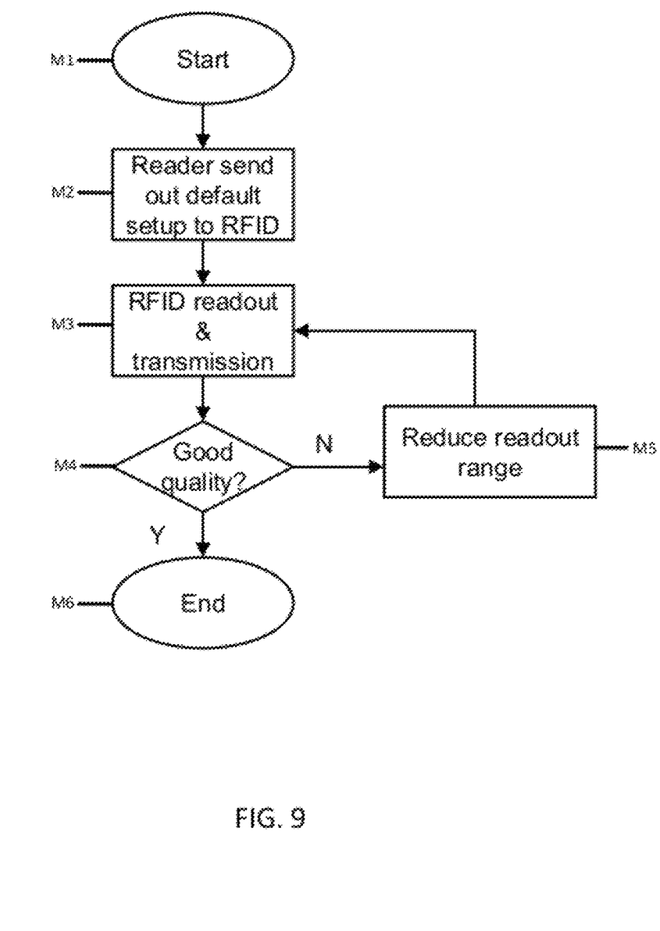
FIG. 9 depicts a method flow diagram for reducing range readout to improve image quality according to an embodiment of the present invention.

Referring to FIG. 9, another quality-improving technique will be explained. As shown, the process is started in step M1.

In step M2, the reader sends out default setup to the RFID transponder. As indicated above, such setup can address variables such as readout range, integration time, ADC setup, processing type, channel and source, coding, etc. Regardless, in step M3, RFID readout and transmission is made. In step M4, it is determined whether sufficient quality exists. Sufficient quality can be determined by comparing the image to a predetermined threshold. This can be accomplished by the RFID reader using techniques such as a threshold pixel scan, a gray scale pixel scan, and/or image recognized data. If quality does not meet thresholds, the reader can deduce the readout range in step M5. Alternatively, along these lines, if range is insufficient, any of the techniques of the above-incorporated patent applications can be implemented. For example, range can be extended using fields generated by other RFID transponders, by deriving power from power lines, by deriving additional power from wireless networks, etc.

Figure 10:
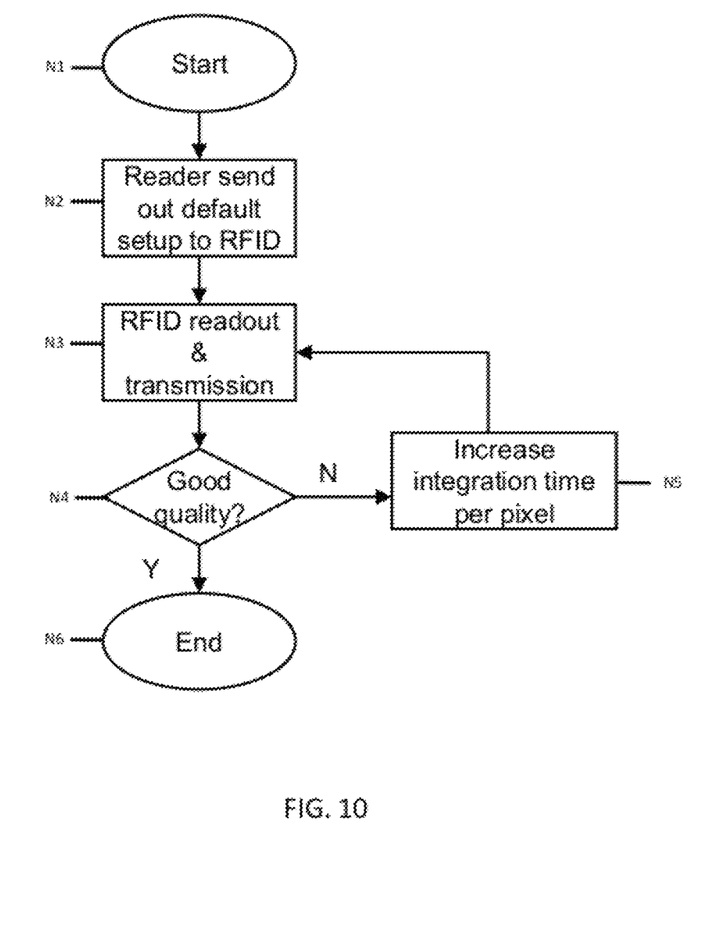
FIG. 10 depicts a method flow diagram for increasing integration time per pixel to improve image quality according to an embodiment of the present invention.

Referring to FIG. 10, another quality-improving technique will be explained. As shown, the process is started in step N1. In step N2, the reader sends out default setup to the RFID transponder. As indicated above, such setup can address variables such as readout range, integration time, ADC setup, processing type, channel and source, coding, etc. Regardless, in step N3, RFID readout and transmission is made. In step N4, it is determined whether sufficient quality exists. Sufficient quality can be determined by comparing the image to a predetermined threshold. This can be accomplished by the RFID reader using techniques such as a threshold pixel scan, a gray scale pixel scan, and/or image recognized data. If quality does not meet thresholds, the integration time per pixel can be increased in step N5. Once quality is sufficient, the process can end in step N6.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An imaging-based radio-frequency identification (RFID) transponder, comprising:
    a controller that obtains a default setup from an RFID reader that is external to the RFID transponder, the default setup including a readout range;
    a photo-responsive cell for capturing an image based on the readout range;
    an analysis component for, in response to a determination that the available power is sufficient to perform an analysis of the image, analyzing the image on the RFID transponder based on an available power in the RFID transponder;
    a power component configured to, in response to a determination that the available power is not sufficient to perform the analysis, secure additional power supplemental to the available power from a strong passive ad-hoc RFID network of which the RFID transponder is a member to increase a readout range of the RFID transponder, the additional power derived from at least one of the following: at least one power line, at least one wireless network, and a field generated by at least one second RFID transponder other than the RFID transponder,
    the RFID transponder, in response to the determination that the available power is not sufficient to perform the analysis, gaining a set of user rights and controls on the wireless network, the RFID transponder gaining a higher priority on the wireless network using the set of user rights and controls, and the RFID transponder being configured to request the additional power:
        from the power line; and
        from the wireless network using the set of user rights and controls; and
    a quality determinator that compares a quality of the image to a predetermined threshold and, in response to a determination that the quality is insufficient, modifies values in the default setup.

2. The imaging-based RFID transponder of claim 1, further comprising a light source that is adjacent to the photo-responsive cell for improving the quality of the image when captured by the photo-responsive cell.

3. The imaging-based RFID transponder of claim 1, the analysis component being further configured to, in response to a determination that the available power and the additional power together are insufficient to analyze the image, transmit data corresponding to the image to an RFID reader for analysis.

4. The imaging-based RFID transponder of claim 1, the RFID reader being configured to adjust a quality of communication with which the RFID transponder operates.

5. The imaging-based RFID transponder of claim 4, the quality of communication being adjusted by adjusting a setup of the RFID transponder.

6. The imaging-based RFID transponder of claim 4, the quality of communication being adjusted by reducing a readout range of the RFID transponder.

7. The imaging-based RFID transponder of claim 4, the quality of communication being adjusted by increasing an integration time per pixel of the image.

8. An imaging-based radio-frequency identification (RFID) transponder, comprising:
    a controller that obtains a default setup from an RFID reader that is external to the RFID transponder, the default setup including a readout range;
    a photo-responsive cell for capturing an image based on the readout range; and
    an analysis component being configured to:
        determine whether available power of the RFID transponder is sufficient to analyze the image;
        analyze, in response to a determination that the available power is sufficient, the image on the RFID transponder;
        secure, in response to a determination that the available power is insufficient, additional power supplemental to the available power from a strong passive ad-hoc RFID network of which the RFID transponder is a member to increase a readout range of the RFID transponder, the additional power derived from at least one of the following: at least one power line, at least one wireless network, and a field generated by at least one second RFID transponder other than the RFID transponder,
    the RFID transponder, in response to the determination that the available power is insufficient, gain a set of user rights and controls on the wireless network, the RFID transponder gain a higher priority on the wireless network using the set of user rights and controls, and the RFID transponder securing the additional power:
        from the power line; and
        from the wireless network using the set of user rights and controls;

transmit, in response to a determination that both the available power and the additional power are insufficient to analyze the image, data corresponding to the image to an RFID reader for analysis;
compare a quality of the image to a predetermined threshold; and
in response to a determination that the quality is insufficient, modify values in the default setup.

9. The imaging-based RFID transponder of claim 8, further comprising a light source that is adjacent to the photo-responsive cell for improving the quality of the image when captured by the photo-responsive cell.

10. The imaging-based RFID transponder of claim 8, the RFID reader being configured to adjust a quality of communication with which the RFID transponder operates.

11. The imaging-based RFID transponder of claim 10, the quality of communication being adjusted by adjusting a setup of the RFID transponder.

12. The imaging-based RFID transponder of claim 10, the quality of communication being adjusted by reducing a readout range of the RFID transponder.

13. The imaging-based RFID transponder of claim 10, the quality of communication being adjusted by increasing an integration time per pixel of the image.

14. A method for capturing an image using a radio-frequency identification (RFID) transponder, comprising:
obtaining a default setup from an RFID reader that is external to the RFID transponder, the default setup including a readout range;
capturing an image using a photo-responsive cell integrated with the RFID transponder based on the readout range;
determining whether the RFID transponder has sufficient power to analyze the image;
analyzing, in response to a determination that the available power is sufficient, the image on the RFID transponder;
in response to a determination that sufficient power does not exist, attempting to secure additional power from a strong passive ad-hoc RFID network of which the RFID transponder is a member to increase a readout range of the RFID transponder, the additional power derived from at least one of the following: at least one power line, at least one wireless network, and a field generated by at least one second RFID transponder other than the RFID transponder;
the RFID transponder, in response to the determination that sufficient power does not exist, gain a set of user rights and controls on the wireless network, the RFID transponder gain a higher priority on the wireless network using the set of user rights and controls, and the RFID transponder securing the additional power:
from the power line; and
from the wireless network using the set of user rights and controls;
transmitting, in response to a determination that both the available power and the additional power are insufficient to analyze the image, data corresponding to the image to an RFID reader for analysis;
comparing a quality of the image to a predetermined threshold; and
modifying, in response to a determination that the quality is insufficient, values in the default setup.

15. The method of claim 14, the determining comprising comparing a current power level of the RFID transponder to a predetermined threshold, the predetermined threshold being a minimum amount of power needed to analyze the image on the RFID transponder.

16. The method of claim 14, further comprising illuminating an object from which the image is taken using a light source integrated with the RFID transponder adjacent to the photo-responsive cell.

17. The method of claim 14, further comprising adjusting a quality of communication with which the RFID transponder operates using the RFID reader.

18. The method of claim 17, the adjusting comprising adjusting a setup of the RFID transponder.

19. The method of claim 17, the adjusting comprising reducing a readout range of the RFID transponder.

20. The method of claim 17, the adjusting comprising increasing an integration time per pixel of the image.

* * * * *